United States Patent

Inoue et al.

[11] Patent Number: 5,084,302
[45] Date of Patent: Jan. 28, 1992

[54] PROCESS FOR PREPARING AN ORGANIC COMPOUND THIN FILM FOR AN OPTICAL DEVICE

[75] Inventors: Atsuhisa Inoue, Kitakatsuragi; Mariko Ishino, Nara; Yoshiro Akagi, Osaka, all of Japan

[73] Assignee: Sharp Kabushiki Kaisha, Osaka, Japan

[21] Appl. No.: 503,312

[22] Filed: Mar. 29, 1990

[30] Foreign Application Priority Data

Mar. 30, 1989 [JP] Japan .................................. 1-80667

[51] Int. Cl.$^5$ .................... B05D 3/12; B05D 5/06; B05D 3/06
[52] U.S. Cl. ..................... 427/164; 427/322; 427/25.6; 427/307
[58] Field of Search ............ 427/255.6, 307, 162, 427/165, 164, 407.1, 412.1, 322, 299, 41; 428/473.5

[56] References Cited

U.S. PATENT DOCUMENTS

| | | | |
|---|---|---|---|
| 4,400,424 | 8/1983 | Hatada et al. | 428/212 |
| 4,543,275 | 9/1985 | Akashi et al. | 427/250 |
| 4,842,946 | 6/1989 | Foust et asl. | 428/458 |

FOREIGN PATENT DOCUMENTS

| | | |
|---|---|---|
| 62-160427 | 7/1987 | Japan . |
| 63-227110 | 9/1988 | Japan . |
| 01-102436 | 4/1989 | Japan . |

Primary Examiner—Shrive Beck
Assistant Examiner—Roy V. King
Attorney, Agent, or Firm—David G. Conlin; Peter F. Corless

[57] ABSTRACT

A process for preparing an organic compound thin film for use in an optical device including steps of forming a multiplicity of geometric linear streaks with microscopic unevenness in section on a substrate at least whose surface is made up of an amorphous organic polymer layer; thereafter vapor-depositing on the surface an organic compound capable of exhibiting non-linear optical characteristics to form a non-linear optical material film.

6 Claims, 2 Drawing Sheets (a)

(b)

(c)

$2\theta$/deg. (Cu K$\alpha$)

PROCESS FOR PREPARING AN ORGANIC COMPOUND THIN FILM FOR AN OPTICAL DEVICE

BACKGROUND OF THE INVENTION

1. Field of the Invention

The present invention relates to a process for preparing an organic compound thin film for an optical device. Particularly, the thin film of the invention can be used in a non-linear optical device, photoelectric device, optical integrated-circuit device, and the like.

2. Description of the Prior Art

Organic compounds are attracting considerable attention in the above applicable fields thereof in that they have suitable characteristics but also allow relatively unrestrained material design. However, to use organic compounds in a practical device in such fields, molecules of these organic compounds need to be oriented and crystallized.

LB technique (Langmuir-Blodgett's technique) is conventionally known as a preparing technique of an organic thin film having an orientation property. This technique is characterized in that organic molecules, each of which has a hydrophilic group at one side and a hydrophobic group at the other side, are developed on a water surface so as to form a monomolecular layer, and such a layer is accumulated one after another with its molecules "stood" on a suitable substrate. Usually, this technique can yield a thin film whose molecular axis is oriented perpendicular to the substrate.

However, the following restrictions exist in LB technique to have a well-controllable and well-oriented monomolecular thin film. First, an organic molecule to be used must be so designed and synthesized as to have a long-chain alkyl group as a skeleton where a hydrophilic group and a hydrophobic group are well balanced at one end and the other end thereof, respectively. Second, since this technique is a wet method, materials to be used and applications of the film are restricted. In addition, since a monomolecular layer is stacked one after another, it takes long time to form a thin film.

There is a vacuum vapor deposition technique other than LB technique to have an organic compound thin film. This technique is a dry method and widely used to form an organic compound thin film of a low to high molecular compound.

Generally, it is not always easy to control orientation of molecules in this technique. To overcome this problem, Japanese Unexamined Patent Publication SHO 160427/1987 discloses such a technique that a polyester orientation film which is uniaxially oriented is used as a substrate to control orientation of vapor-deposited organic molecules. This technique is characterized in that a high molecular film as a substrate is rendered uniaxially oriented by drawing or the like, and an organic compound is vapor-deposited thereon by vacuum vapor deposition. However, a thin film prepared by the technique does not have enough orientation degree for practical use.

Thus, a thin film prepared by each of the above techniques does not have enough molecular orientation, therefore, it cannot exhibit enough non-linear optical effects such as a second harmonic and the like.

SUMMARY OF THE INVENTION

It is an object of the invention to provide a process for preparing an organic compound thin film wherein organic molecules or crystals thereof are highly oriented in vacuum vapor deposition technique, the organic compound thin film being useful in a non-linear optical device and the like.

The inventors of this invention have found that highly oriented crystals constituting a thin film are vapor-deposited when geometric linear streaks with a microscopic unevenness are formed on a substrate surface of amorphous organic polymer and an organic compound thin film is then vapor-deposited thereon. This is supposed that, by forming the geometric linear streaks with a microscopic unevenness, a portion of or the whole very top surface of the amorphous polymer substrate comes to have strong physical interaction with the deposited molecules.

Thus, according to the present invention, there is provided a process for preparing an organic compound thin film for use in an optical device comprising steps of forming a multiplicity of geometric linear streaks with a microscopic unevenness on a substrate at least whose surface is made up of an amorphous organic polymer layer; thereafter vapor-depositing on said surface an organic compound capable of exhibiting non-linear optical characteristics to form a non-linear optical material film.

DETAILED DESCRIPTION OF THE PREFERRED EMBODIMENT

Figure 1:
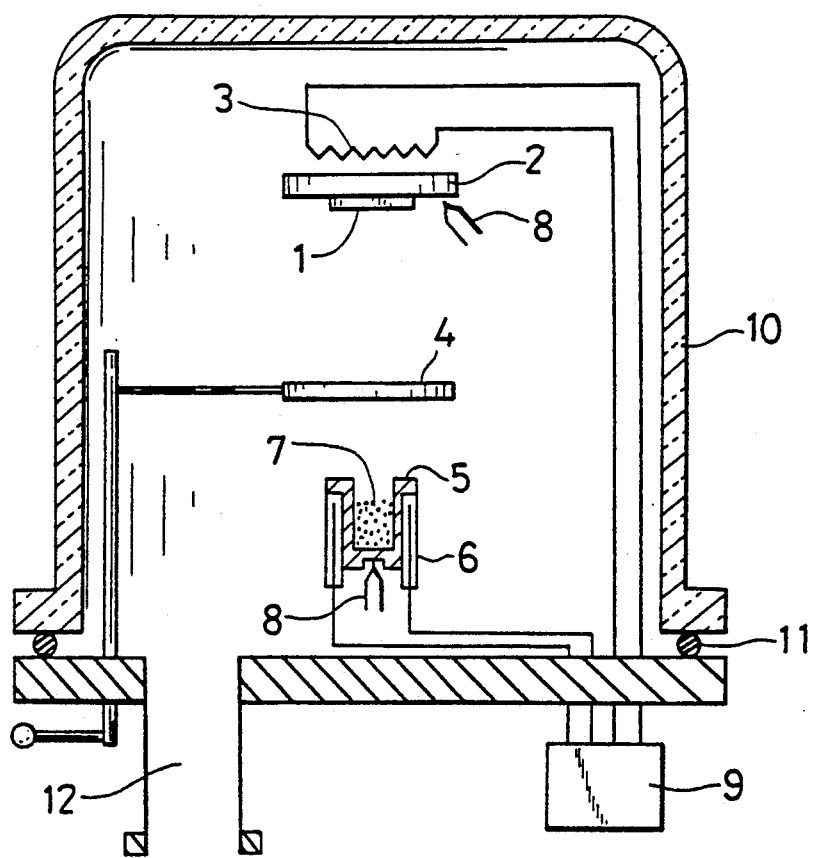
FIG. 1 is an explanatory view showing a vapor deposition apparatus used in an example of the invention.

In the present invention, a multiplicity of geometric linear streaks with microscopic unevenness on a substrate at least whose surface is made up of an amorphous organic polymer layer are formed.

The above amorphous organic polymer can be selected from, for example, polyimides, phenolic resins, poly(methyl methacrylates), polystyrenes, and their low grade pre-polymers (usually their polymerization degree ranges from $10^3$ to $10^5$), and the like.

If functional groups in the principal chain or side chain of the amorphous organic polymer are appropriately selected, orientation of the deposited molecules (molecules of an organic compound capable of exhibiting nonlinear optical characteristics) may become highly controllable because of synergetic effects with the geometric linear streaks.

The amorphous organic polymer can be molded into a plate or curve plate of 0.01 to 10 μm thick to form a substrate by using a known method. Usually, it is more convenient to coat a plate or curve plate of an inorganic compound, for example, silicon, glass, or the like with an amorphous organic polymer by using a known method so as to form a substrate with an amorphous organic polymer layer.

The abovementioned geometric linear streaks allow the organic compound exhibiting non-linear optical characteristics to orient, and can be formed on the amorphous organic polymer layer constituting a surface of the above substrate.

A size of unevenness made by the geometric linear streaks is not specifically limited, but desirably as small as a size of the deposited molecule (dozens of A to hundreds of A). The size in section of unevenness may be 5 A to 1 μm, preferably 10 A to 500 A in gap and in pitch. However, it is difficult to obtain a well-oriented thin film if the size of unevenness is out of the above range.

The geometric linear streaks may be formed by mechanical rubbing, lithography using electromagnetic wave including light wave, charged-particle beam, neutral beam, chemical etching, or the like. Especially, rubbing with fine fibers is convenient and preferable.

In the present invention, the organic compound capable of exhibiting non-linear optical characteristics is vapor-deposited on the substrate to form the non-linear optical material layer. The organic compound capable of exhibiting non-linear optical characteristics can be selected from, for example, 2-methyl-4-nitroaniline, 7-diethylamino-4-methylcumarin, 3-nitroaniline, 5-nitrouracil, α-resolcinol, 3-aminophenol, 1,3-dinitrobenzene, 2-bromo-4-nitroaniline, methyl 2-[(2,4-dinitrophenyl)amino]propanoate, N,N'-dimethylurea, 3-methyl-4-nitropyridine-1-oxide, N-(4-nitrophenyl)-(L)-prolinol, and the like. Among them, 2-methyl-4-nitroaniline is preferable because it exhibits marked non-linear optical characteristics.

Conditions for carrying out the vapor deposition are not particularly limited. However, the deposited film thickness is preferably approximately 100 A to 10 μm to obtain a well-oriented non-linear optical material film. Additionally, too high temperature of the vapor source is not desirable to avoid decomposition of the organic compound.

According to the present invention, the geometric linear streaks cause the organic compound exhibiting non-linear optical characteristics to orient in a predetermined direction, the organic compound being vapor-deposited on the substrate. This makes it possible to remarkably enhance the orientation property of the non-linear optical material layer which is formed on the organic compound exhibiting non-linear optical characteristics. As well, it becomes possible to form non-linear optical material layers different in physical and chemical properties by selecting a functional group in the amorphous polymer constituting the surface of the substrate.

EXAMPLE 1

Here, a process for preparing a crystalline thin film of 2-methyl-4-nitroaniline (hereinafter abbreviated as MNA), which is attracting attention as an organic compound material exhibiting great non-linear optical effects, is exemplified to specifically describe the invention with reference to the drawings. It is to be noticed that materials used for the substrate and vapor deposition are not limited to polyimide and MNA, respectively.

Preparation of the MNA non-linear optical material layer is performed using a vacuum vapor deposition apparatus shown in FIG. 1. First, a solution of a polyamic acid in N-methylpyrrolidone was spin-coated on a quartz glass substrate. After drying, it was heated and baked (at 300° C.) to form a polyimide film of approximately 1000 A thick. Further, the surface of the polyimide film was rubbed in the following manner to form geometric linear streaks. The obtained polyimide film was first pressed against a cloth with its fibers gigged under a predetermined pressure, the fiber being approximately 10 μm in diameter. The substrate was then moved at a constant speed in a fixed direction. Further, the substrate was washed with an organic solvent such as isopropyl alcohol or the like to yield the substrate 1. Unevenness in section of the geometric linear streaks was A in gap and A in pitch.

The substrate 1 was attached to a substrate holder 2 and a commercially available MNA reagent was put in a crucible 5. Subsequently, air in a glass bell jar 10 was discharged through a vent opening 12 to have a vacuum bell jar. Next, temperature of the substrate 1 was kept at 0° C., and the crucible 5 accommodating the MNA was heated under vacuum of the order of $10^{-6}$ Torr to sublimate the MNA, so that the MNA was vapor-deposited on the substrate 1 to form a thin film of approximately 3 μm thick.

COMPARATIVE EXAMPLE 1

A MNA thin film was formed in the same manner as in the Example 1 with the exception that the polyimide film was not formed on the quartz substrate.

COMPARATIVE EXAMPLE 2

A MNA thin film was formed in the same manner as in the Example 1 with the exception that the rubbing and washing were not carried out.

Figure 2:
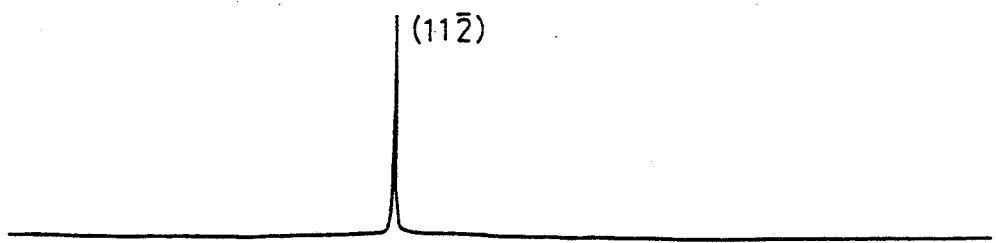
FIGS. 2(a), 2(b) and 2(c) are each an X-ray diffraction pattern of MNA thin films prepared in the example of the invention and comparative examples 1 and 2, respectively.
Figure 2:
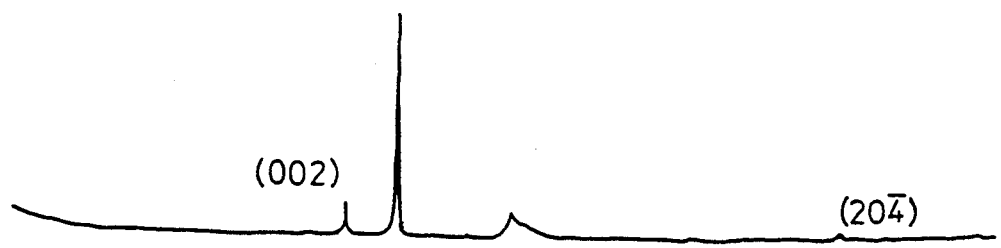
Figure 2:
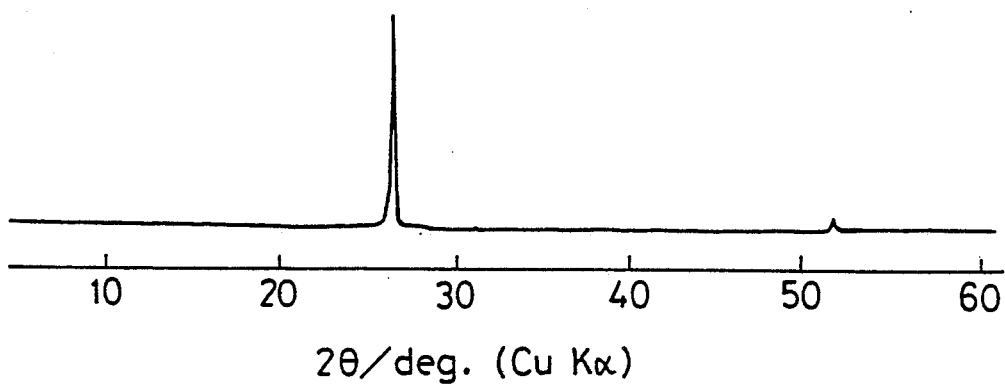

Then, X-ray diffraction analysis was conducted on crystalline orientation of the MNA thin films prepared in Example 1 of the invention, and in Comparative Examples 1 and 2, respectively. FIG. 2(a) to 2(c) are each an X-ray diffraction pattern of the MNA films prepared in the Example 1 of the invention and Comparative Examples 1 and 2, respectively. According to the X-ray diffraction patterns, in the case of the MNA thin film [FIG. 2(b)] formed on the quartz substrate in Comparative Example 1, there appeared both strong reflections (11$\bar{2}$) and (020). As well, in the case of the MNA thin film [FIG. 2(c)] formed on the polyimide-film surface substrate in Comparative example 2, there appeared an extremely strong reflection (11$\bar{2}$) and a slight reflection (20$\bar{4}$).

In contrast, in the case of the MNA thin film prepared in Example 1 of the invention, the MNA thin film exhibited nearly complete uniaxial orientation in the (11$\bar{2}$) direction as shown in FIG. 2(a).

Accordingly, the above facts prove that the present invention is an excellent process for preparing an organic compound thin film (non-linear optical material layer). As well, the MNA thin film prepared on the quartz glass substrate via the polyimide film rubbed in accordance with the invention can be suitably used in a waveguide-type non-linear optical device.

Thus, according to the present invention, a non-linear optical material film having an very high orientation property can be prepared. Further, by using this non-linear optical material film, a high-quality non-linear optical device can be manufactured, if it is configured with, for example, laser-beam projecting means, the non-linear optical material film, and outgoing light detecting means for detecting outgoing light from the film.

What is claimed is:

1. A process for preparing an organic compound thin film for use in an optical device comprising steps of forming a multiplicity of geometric linear streaks with microscopic unevenness in section on a substrate, at least a portion of the substrate surface comprising an amorphous organic polymer layer; thereafter vapor-depositing on said surface an organic compound exhibiting non-linear optical characteristics to form a non-linear optical material film.

2. A process for preparing an organic compound thin film as set forth in claim 1, wherein said amorphous organic polymer layer is selected from the group consisting of polyimide, phenolic resin, poly(methyl methacrylate) and polystyrene.

3. A process for preparing an organic compound thin film as set forth in claim 1, wherein said geometric linear streaks have unevenness in section with 5 A- to 1 μm-gap and 5 A- to 1 μm-pitch.

4. A process for preparing an organic compound thin film as set forth in claim 1, wherein said geometric linear streaks are formed by mechanical rubbing, lithography using a charged- or neutral-beam, or chemical etching using etchant.

5. A process for preparing an organic compound thin film as set forth in claim 1, wherein said organic compound exhibiting non-linear optical characteristics is selected from the group consisting of 2-methyl-4-nitroaniline, 7-diethylamino-4-methylcumarin, 3-nitroaniline, 5-nitrouracil, αresolcinol, 3-aminophenol, 1,3-dinitrobenzene, 2-bromo-4-nitroaniline, methyl 2-[(2,4-dinitrophenyl)amino]-propanoate, N,N'-dimethylurea, 3-methyl-4-nitropyridine-1-oxide and N-(4-nitrophenyl)-(L)-prolinol.

6. A process for preparing an organic compound thin film as set forth in claim 1, wherein said non-linear optical material film has a thickness of about 100 angstroms to 10 μm.

* * * * *